United States Patent [19]  [11] 4,132,758
Frankiewicz et al.  [45] Jan. 2, 1979

[54] COPPER LEACHING EMPLOYING NITROGEN DIOXIDE AS OXIDANT

[75] Inventors: Theodore C. Frankiewicz, Westminster, Calif.; Robert E. Lueders, Needham, Mass.

[73] Assignee: Kennecott Copper Corporation, New York, N.Y.

[21] Appl. No.: 855,983

[22] Filed: Nov. 30, 1977

[51] Int. Cl.² .................. C01G 3/10; C01G 9/06; C01G 51/10; C01G 53/10
[52] U.S. Cl. .................. 423/27; 423/53; 423/109; 423/150; 423/41
[58] Field of Search .............. 75/101 R, 117, 115; 423/27, 41, 658.5, 150, 109, 53

[56] References Cited

U.S. PATENT DOCUMENTS

| | | | |
|---|---|---|---|
| 287,737 | 10/1883 | Stetefeldt | 75/101 R |
| 653,414 | 7/1900 | Fink | 75/101 R |
| 1,150,787 | 8/1915 | Rankin | 75/101 R |
| 2,871,116 | 1/1959 | Clark | 75/115 |

OTHER PUBLICATIONS

Cotton et al. *Advanced Inorganic Chemistry*, 2nd Edition, Interscience Publishers, N.Y. 1966 pp. 342–347.

*Primary Examiner*—Brian Hearn
*Attorney, Agent, or Firm*—John L. Sniado; Anthony M. Lorusso

[57] ABSTRACT

Sulfidic minerals containing metal values such as copper, silver, nickel, cobalt, molybdenum, zinc, iron, or mixtures thereof are oxidized with nitrogen dioxide to enable the metal values to be solubilized in an aqueous acidic leach liquor. In practicing the invention, the minerals are added to an aqueous acidic leach liquor and a nitrogen dioxide containing gas is sparged through the slurry to oxidize the metal values. During the reaction, the nitrogen dioxide is reduced to nitric oxide. The nitric oxide is oxidized to nitrogen dioxide by oxygen, either in-situ, or in a separate off-gas oxidizer.

7 Claims, 4 Drawing Figures

COPPER LEACHING EMPLOYING NITROGEN DIOXIDE AS OXIDANT

BACKGROUND OF THE INVENTION

This invention relates to a hydrometallurgical process for recovering metal values from sulfidic minerals and more particularly to a leaching process wherein a nitrogen dioxide containing gas is passed through an acidic leaching liquor.

As a preliminary step to winning copper, silver, nickel, cobalt, molybdenum, iron and/or zinc metal from sulfidic minerals, it is necessary to oxidize the minerals to provide aqueous solutions containing ions of these metal values. The oxidation reactions may be effected by high temperature roasts or hydrometallurgical processes involving the use of an aqueous leach liquor. The former procedure has the advantages of being relatively nonselective in terms of mineral reactivities and of consuming significantly less energy during the oxidation process as compared with hydrometallurgical techniques. Unfortunately, conventional roast reactors produce large volumes of dilute sulfur dioxide gas which necessitates the use of expensive ancillary equipment for removing sulfur dioxide from the effluents so that environmental protection standards can be met. The hydrometallurgical processes, on the other hand, typically involve relatively expensive reagents such as nitric acid which, from a practical point of view, must be regenerated and recycled. The cost of the equipment needed to regenerate nitric acid in a conventional nitric acid leach liquor represents a significant capital investment. Accordingly, the use of nitric acid for leaching metal values from sulfidic minerals has not had wide commercial success.

SUMMARY OF THE INVENTION

In accordance with the present invention, an aqueous acidic leach liquor containing nitrogen dioxide is used as the principal oxidizing agent for sulfidic minerals. The use of this gas has advantages since it is easily regenerated, highly soluble in water, and quite effective in oxidizing sulfidic minerals. The oxidation product of the nitrogen dioxide is essentially entirely nitric oxide, and this may be readily reconverted to nitrogen dioxide by reaction with oxygen. Accordingly, oxygen gas may be introduced into the acidic leach liquor together with nitrogen dioxide so that, as the oxidation of the minerals proceeds, the nitric oxide by-product is oxidized in-situ to nitrogen dioxide. Alternatively, nitric oxide may be oxidize to nitrogen dioxide in a separate reactor and the heat of reaction dissipated or captured for use in another step in the overall metal recovery process. In either case substantial cost savings accrue if $NO_2$ is used as an oxidant for the mineral, as compared with using nitric acid in the conventional manner, since the requirement that a nitric acid plant be included in the system to regenerate nitric acid is eliminated.

In the process of the invention, a particulate sulfidic mineral is added to an aqueous acidic leach liquor and a nitrogen dioxide containing gas is sparged through the resulting slurry. The $NO_2$ is rapidly absorbed by the slurry. However, the slurry may be agitated to increase contact between the $NO_2$ and the mineral. Preferably, the nitrogen dioxide is mixed with oxygen so that the nitric oxide produced is reoxidized in-situ to nitrogen dioxide. This regeneration may also occur in a separate off-gas reactor if desired.

Accordingly, it is an object of the invention to provide a hydrometallurgical metal leaching process wherein nitrogen dioxide is the principal oxidant for the mineral to be oxidized.

Another object of the invention is to provide a leaching procedure in which the volume of off-gases produced is low compared to conventional nitric acid leaching systems or to high temperature roasting processes.

Another object of the invention is to provide a hydrometallurgical leach process which easily and rapidly adapts to changes in the mineralogy and grade of the concentrate feed.

Another object of the invention is to provide a rapid, hydrometallurgical oxidation process for sulfide minerals which is readily subjected to computerized process control.

Another object of the invention is to provide a hydrometallurgical leach process with all the above advantages which readily attacks even the more refractory sulfide minerals such as $CuFeS_2$ and $MoS_2$.

DESCRIPTION OF THE PREFERRED EMBODIMENTS

Figure 1:
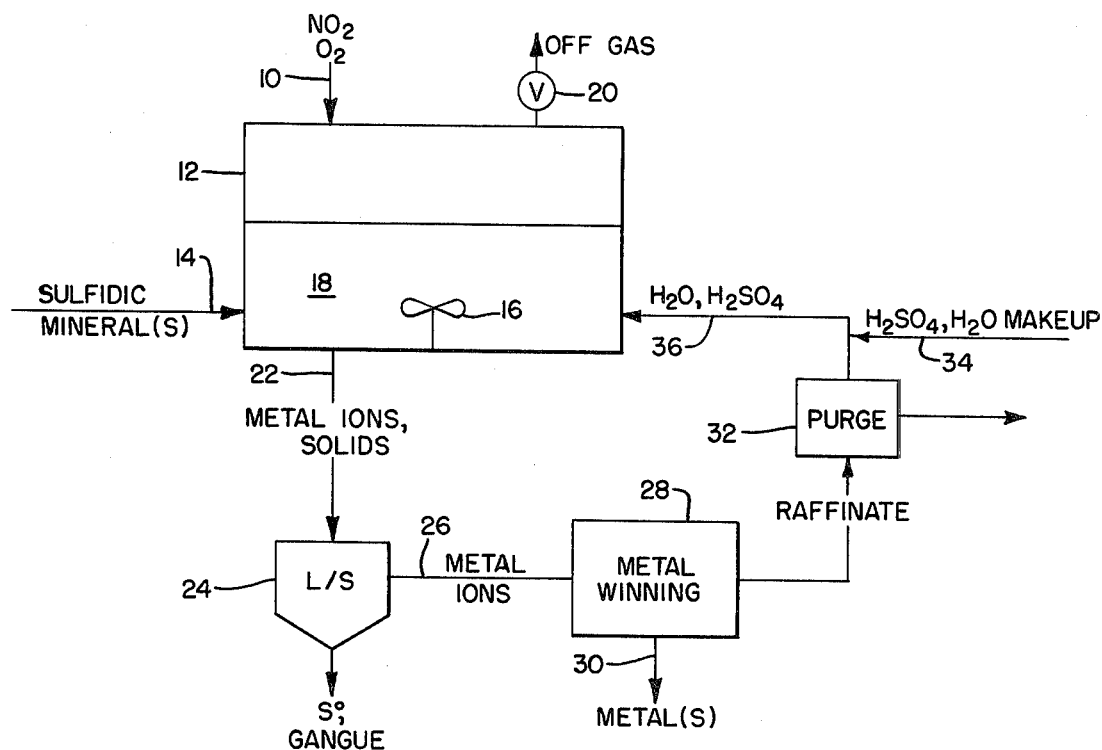
FIG. 1 is a schematic diagram illustrating a metal recovery scheme employing one important embodiment of the leaching process of the invention.

In its broadest aspects, the invention provides a process for converting particulate ores or concentrates thereof consisting of copper, silver, nickel, cobalt, molybdenum, and/or zinc values associated with sulfide and/or sulfide and iron to aqueous acidic solutions containing $CU^{++}$, $Ag^{30}$, $Ni^{++}$, $Co^{++}$, $Mo^{++}$, $Fe^{++}$ or $Zn^{++}$. The resulting solutions may be treated to recover metal values by any of the well-known techniques such as electrowinning or treatment with suitable organic reductants. The foregoing oxidation is accomplished in an acidic leach liquor preferably containing the relatively inexpensive sulfuric acid in the presence of nitrogen dioxide ($NO_2$).

It should be noted at this point that although it is well-known that nitrogen dioxide can produce nitric acid when mixed with cool water and that an aqueous solution of nitric acid and sulfuric acid is a well-known leaching system, the instant invention does not utilize nitrate as its principal oxidizing agent. In fact, the nitrate concentration present in the leach liquor during the process of the invention is quite low and is at its lowest point when most of the leaching action is occuring. Also, the overall stoichiometry of the leaching reaction does not involve nitrate. Accordingly, while a certain amount of nitrate is incidentally produced in the leach liquor and while the nitrate produced may take part in various side reactions, the process disclosed herein is distinctly different from the well-known sulfuric acid-nitric acid leach. This is entirely consistent with the prior art on nitric acid leaching (e.g., U.S. Pat. No. 3,793,429) which teaches that at low [$NO_3^-$], the rate of sulfide oxidation by nitric acid is slow.

In the process of the invention, it is preferred that the sulfidic minerals be supplied to the leaching tank in particulate form because the reaction rate depends in part on the surface area available for reaction. Accordingly, those skilled in the art will appreciate that particle size will have an effect on the kinetics of the overall process. Also, as is the case with most leaching procedures, concentrates of the minerals are preferred over raw ores. In one important embodiment of the invention, a sulfide concentrate was particulated to −325 mesh and added to a sufficient amount of leach liquor to produce a slurry containing 15% solids by wt.

The nitrogen dioxide used in the leaching procedure may be either pure nitrogen dioxide, or a nitrogen dioxide containing gas which has been diluted with an oxidizing gas, e.g., air, or, as will be explained more fully below, oxygen. Since the reaction of $NO_2$ is stoichiometric, it is preferred that a stoichiometric excess of nitrogen dioxide be fed to the leaching tank during the course of the leaching procedure.

It is preferred that the particulate sulfidic mineral or minerals involved and the $NO_2$ gas be intimately associated. There are various ways to accomplish this result. Thus, nitrogen dioxide may be supplied above the leach liquor and an impeller or the like may be used to agitate the aqueous phase and to entrain the gaseous oxidant. Alternatively, or in addition, the $NO_2$ may be sparged through the leach liquor using conventional sparging techniques and equipment. Both of these processes and others which may be envisioned are facilitated by the fact that $NO_2$ is highly soluble in aqueous acidic solutions.

Copper containing sulfidic minerals exemplified by ores comprising $CuFeS_2$ (chalcopyrite) is the preferred material for treatment in the process of the invention. When a mineral containing $CuFeS_2$ and $FeS_2$ is treated in accordance with the invention, copper and iron ions are produced in accordance with the following overall reaction stoichiometry;

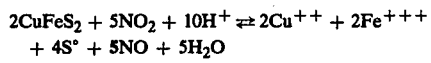

$$2CuFeS_2 + 5NO_2 + 10H^+ \rightleftarrows 2Cu^{++} + 2Fe^{+++} + 4S^\circ + 5NO + 5H_2O$$

$$\Delta G = -54 \text{ Kcal/mole}, \Delta H = -84.7 \text{ Kcal/mole}$$

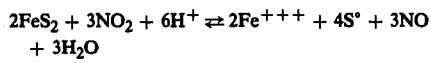

$$2FeS_2 + 3NO_2 + 6H^+ \rightleftarrows 2Fe^{+++} + 4S^\circ + 3NO + 3H_2O$$

$$\Delta G = -29.3 \text{ Kcal/mole}, \Delta H = -49.1 \text{ Kcal/mole}$$

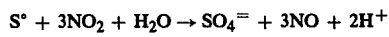

$$S^\circ + 3NO_2 + H_2O \rightarrow SO_4^= + 3NO + 2H^+$$

$$\Delta G = -92.4 \text{ Kcal/mole}, \Delta H = -113.6 \text{ Kcal/mole}$$

As can be seen from the foregoing equations, nitrogen dioxide is consumed and nitric oxide and sulfate are produced. Hydrogen ions are both consumed and produced. Therefore, the acid balance for the process depends upon how much sulfate is actually produced. The stoichiometry listed was observed during the leaching of pure CuS and for the leaching of an actual copper sulfide concentrate. The thermodynamic data set forth above were calculated for a temperature of 100° C. and indicate that the reactions occur spontaneously and are exothermic. It should be noted that nitrate is neither a reactant nor a product in the foregoing reactions.

As the above equations also show, as sulfur is produced the $NO_2$ oxidizes it to sulfuric acid. Since sulfuric acid is produced during the reaction, it is preferred to use this mineral acid as the source of hydrogen ions. However, other inorganic acids such as excess nitric acid, hydrochloric acid and phosphoric acid can be employed as a source of hydrogen ions. The comsumption of hydrogen ions in the leach will vary with the amount of sulfur oxidized to sulfate since this reaction regenerates some of the H+ consumed in the sulfide oxidation. In practice, at the conclusion of the leach, some elemental sulfur will remain in the leach liquor together with the gangue.

In view of the foregoing, it can be seen that nitric oxide is produced as a result of the reduction of the nitrogen dioxide. In accordance with an important aspect of the invention, the nitric oxide is reoxidized to regenerate nitrogen dioxide which is then available for further reaction. Such as oxidation is well known in the art and can readily be effected by oxygen in accordance with the equation:

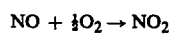

$$NO + \tfrac{1}{2}O_2 \rightarrow NO_2$$

$$\Delta G = -6.64 \text{ Kcal/mole}, \Delta H = -13.8 \text{ Kcal/mole}$$

This reaction is exothermic and very rapid. Accordingly, if oxygen is introduced into the leach liquor together with the nitrogen dioxide, the latter reagent is regenerated spontaneously in-situ. Alternatively, if insufficient quantities of oxygen are introduced together with the nitrogen dioxide in the leach liquor, a nitric oxide rich off-gas may be collected for oxidation in a separate reactor prior to recirculation. While the former procedure is preferred, use of the separate off-gas oxidizer may be advantageous in certain situations since the heat of the reaction may be utilized to generate steam or for preheating additional batches of the leach liquor. With the latter procedure, the temperature in the leaching tank may be more easily maintained at desired levels.

FIG. 1 represents a first embodiment of a metal winning process embodying the leaching procedure of the invention wherein the nitrogen dioxide oxidant is regenerated in-situ. A mixture of nitrogen dioxide and oxygen is introduced via conduit 10 into a closed leaching vessel 12 together with one or more particulate sulfidic minerals which enter via conduit 14. Impeller 16 serves to suspend the particulate material in the aqueous acidic leach liquor 18 and to entrain oxygen and nitrogen dioxide therein. The rate of production of metal ions such as copper and iron depends on the partial pressure of nitrogen dioxide, nitric oxide, and oxygen above the leach liquor, on the temperature of the system, and to some extent on the particle size of the mineral being treated. Valve 20 is adjusted to allow escape of a nitric oxide rich off-gas which in some situations may be recirculated. The liquid-solid mixture containing metal ions, associated anions, gangue solids, and elemental sulfur exit leaching tank 12 via conduit 22 and are introduced into liquid solid separator 24. After removal of the solids, the pregnant liquor is transferred via conduit 26 to conventional metal winning apparatus 28. Apparatus 28 may also involve any necessary purification of the pregnant liquor prior to actual metal recovery (e.g., iron removal, pH adjustment, [$NO_3^-$] adjustment).

It should be noted at this point that the procedure for reducing the metal cations in the pregnant liquor to elemental metals forms no part of the instant invention and may be entirely conventional. Thus, various well-known techniques for reducing the metal ions to elemental metals and/or separating individual metal ions in a mixture from each other prior to reduction may be employed. After separation and collection of the metals of interest as is represented schematically by reference numeral 30, the raffinate which will typically contain a high concentration of sulfate produced by the oxidation of sulfur may be reused. Thus, after purging the raffinate of unwanted ions using conventional techniques in purge system 32, additional acid and water (if necessary) is introduced into the metal-barren leach liquor via conduit 34 and the leach liquor is reintroduced into leaching reactor 12 via conduit 36.

Figure 2:
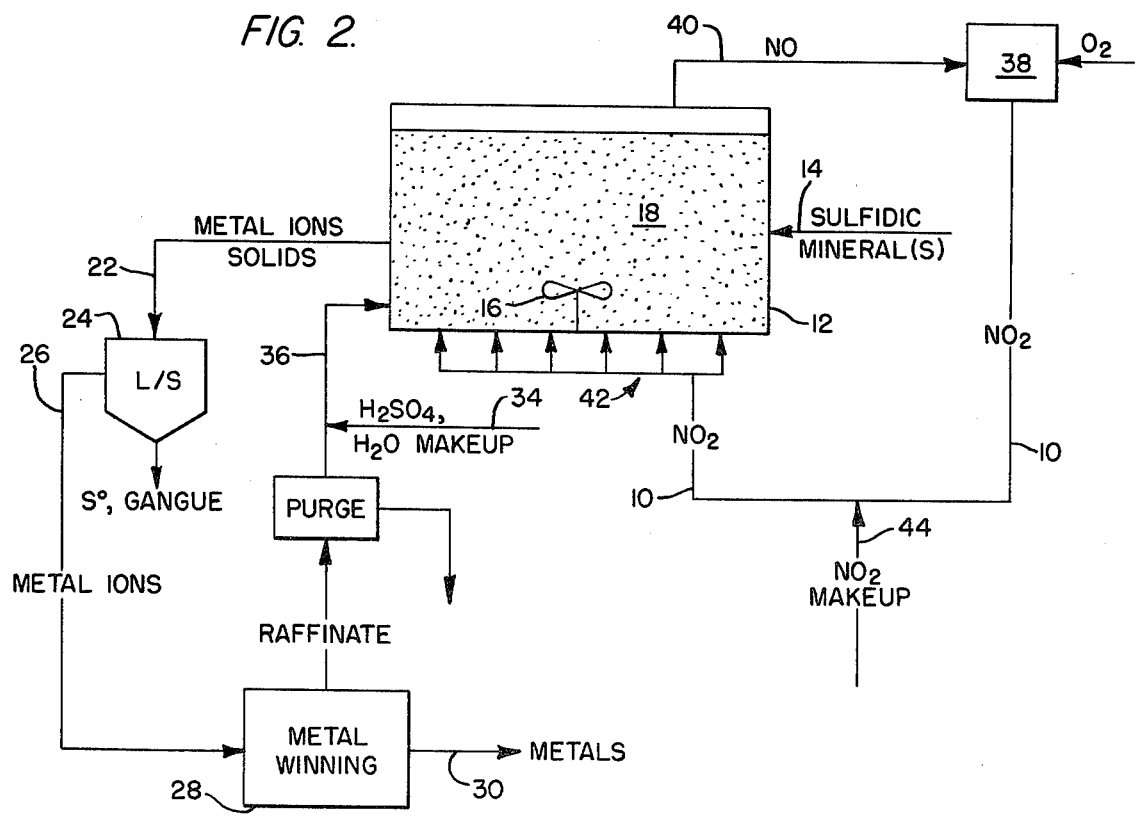
FIG. 2 is a diagram similar to FIG. 1 modified in that a separate reactor for oxidizing nitric oxide is employed.

Referring to FIG. 2, a second metal recovery system embodying the leaching procedure of the invention is shown. The process of FIG. 2 differs from that of FIG. 1 in that, rather than regenerating the nitrogen dioxide in-situ, a separate off-gas oxidizer 38 is employed. In this embodiment, a nitrogen dioxide containing gas which contains no oxygen or only small quantities of oxygen is sparged through the leach liquor 18 contained in reactor 12. Nitric oxide exits via conduit 40 and is mixed with oxygen in off-gas oxidizer 38. A heat exchanger (not shown) may be used to extract heat produced during the oxidation. Nitrogen dioxide is then delivered via conduit 10 into sparging apparatus schematically illustrated at 42. Any loss of nitrogen dioxide via, for example, formation of nitrates which exit with the leach liquor via conduit 22 or in reduction of nitrogen dioxide to nitrous oxide, can readily be made up by introducing additional amounts of nitrogen dioxide as required via conduit 44. Of course, the embodiment shown in FIG. 1 can be modified by sparging $NO_2$ and $O_2$ from beneath the reactor 12 from spargers similar to those shown by reference numeral 42 of FIG. 2.

The invention will be further understood from the following nonlimiting examples.

Figure 3:
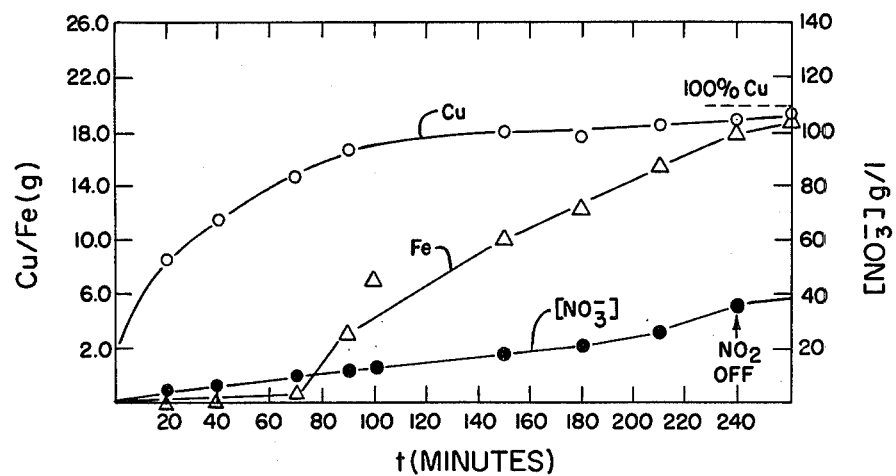
FIG. 3 is a graph showing the mass of copper and iron leached and the nitrate concentration present versus time in a leaching procedure embodying the invention.

Experiments were conducted using a copper concentrate consisting of 20.9% copper, 27.4% iron, 30.2% sulfur, and 21.5% gangue. The leach liquor used was either a 100 g/l or 20 g/l $H_2SO_4$ aqueous solution. 100 g. of the foregoing concentrate was leached in 600 ml of leach liquor for 240 min. at 100° C. During the leach, gaseous nitrogen dioxide and oxygen were sparged into the slurry. The slurry was suspended and the gas dispersed by mixing with a four blade turbine impeller. FIG. 3 sets forth the results of a leach using a 20 g/l $H_2SO_4$ solution while sparging 500 ml per min. $O_2$ and 0.6 grams per minute $NO_2$ at a temperature of 100° C. As can be seen from a study of FIG. 3, during the first 100 minutes of leaching, about 90% of the copper values available were solubilized. In contrast, the weight of solubilized iron remained at a low level at the outset and rose steadily after about 70 minutes. Furthermore, it can be seen that the nitrate concentration remained substantially constant during the course of the leach and reached its zenith after most of the copper and iron values had been solubilized. This occurs at least in part because the residual concentrate does not provide enough surface area to react with all the $NO_2$ entering the reactor. FIG. 3 indicates that nitrate ion does not play a significant part in the process of the invention.

Figure 4:
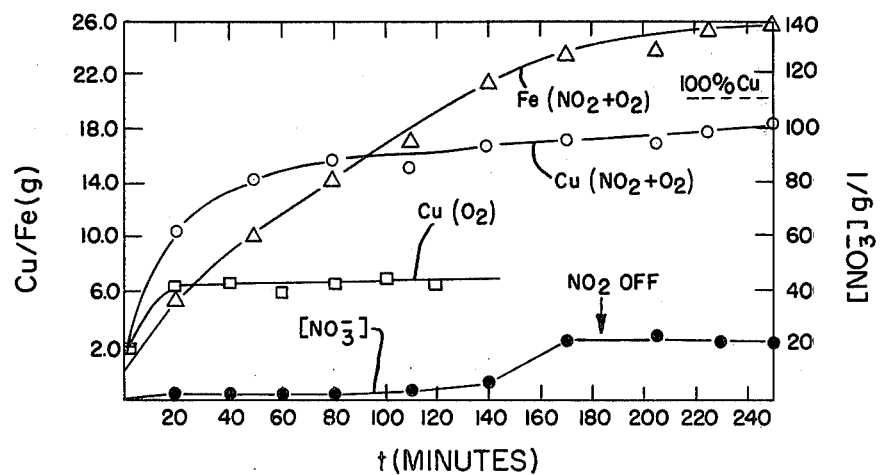
FIG. 4 is a plot of copper extracted versus time comparing the results of an oxygen-sulfuric acid leaching system versus an oxygen-nitrogen dioxide-sulfuric acid leaching system.

FIG. 4 shows a plot of copper and iron extracted versus time for a leach conducted under identical conditions as those set forth with respect to FIG. 3 except the initial $H_2SO_4$ concentration was 100 g/l and oxygen was sparged at a rate of 100 ml/min. The plot compares a leach in which only $H_2SO_4$ and oxygen were used as an oxidant with a leach in which $H_2SO_4$, oxygen, and nitrogen dioxide were employed. As can be seen from a study of FIG. 4, the nitrate concentration during the course of the leach showed characteristics essentially consistent with those set forth in FIG. 3 with $[NO_3^-]$ even lower than in FIG. 3. In the absence of nitrogen dioxide, only about 6 grams of the total of 20.9 grams of copper available for extraction (approximately 29%) were solubilized.

From the foregoing it should be clear that an essential feature of the present invention is to oxidize conventional slurries of sulfidic minerals with nitrogen dioxide to enable metal values contained therein to be rendered leachable in an aqueous leach liquor. Such slurries are produced in a conventional manner by particulating the sulfide ore to be leached to a size of −60 mesh or smaller and adding the particles to a sufficient amount of water to produce a slurry. Conventional slurries typically contain about 15% or less solids by weight. Once the slurry is produced a gaseous mixture containing nitrogen dioxide and possibly oxygen is introduced into the slurry. The amount of nitrogen dioxide utilized will vary depending on the stoichiometry of the reaction. It is desirable to have an amount of nitrogen dioxide that is slightly in excess of the stoichiometric amount needed to oxidize the sulfide ore being treated. As oxygen is added to the slurry with the nitrogen dioxide, it is preferred to utilize an amount of oxygen that is slightly in excess of the amount needed to re-oxidize the nitric oxide produced during oxidation of the sulfide back to nitrogen dioxide. Of course, details of how to calculate the correct stoichiometric amounts of these two gases is well within the skill of those in this art. The sparging rate of the two gases is not critical and would vary according to the amount of slurry being treated and the residence time of the slurry in a reactor. Indeed, the entire nitrogen dioxide and oxygen requirements of a particular batch of slurry being treated may be added to a closed reactor at one time. In this embodiment the reactants are agitated until the sulfide ore has been oxidized. The oxidized slurry would then be removed from the reactor and a fresh batch of slurry would be reintroduced. Of course, the gas used in the preceeding batch would still be capable of oxidizing a new batch of slurry since nitrogen dioxide was regenerated by oxygen. However, additional makeup oxygen should be added to the second batch as required to insure continuous regeneration of the nitrogen dioxide as the process proceeds on a batch operation.

It is preferred to maintain the reaction temperature at a value of less than 115° C. The preferred reaction temperature is between the range of 85° C. to 110° C. The temperature can be controlled by cooling the slurry in any conventional manner.

It is preferable to maintain the pressure during oxidation of the slurry at about atmospheric pressure. It is, however, possible to conduct the oxidation operation at pressures of 15 to 35 psi., absolute.

The materials treated in accordance with the present invention are sulfidic materials containing desired metal values. The materials may be in the form of ores or ores which have been concentrated. Thus, the material being treated may be either an ore or a concentrate in sulfidic form which contains recoverable metal values such as copper, silver, nickel, cobalt, molybdenum, zinc, iron, and mixtures thereof.

The invention may be embodied in other specific forms without departing from the spirit and essential characteristics thereof. The foregoing embodiments are therefore intended to be illustrative and not restrictive, the scope of the invention being indicated by the appended claims rather than by the foregoing description, and all changes which come within the meaning and range of equivalency of the claims are therefore intended to be embraced therein.

We claim:

1. A process for leaching copper values from a sulfidic mineral thereof comprising the steps of:
   A. providing an aqueous acidic leach liquor;
   B. mixing a particulate sulfidic mineral with said leach liquor to form a slurry; and,
   C. contacting said sulfidic mineral with a nitrogen dioxide containing gas in sufficient quantities to allow the nitrogen dioxide to be the principal oxidizing agent to oxidize the mineral to enable the copper values to be solubilized in the leach liquor, said oxidation of the mineral being performed at a temperature below 115° C. and at a pressure between the range of atmospheric pressure and 35 psi.

2. The process as set forth in claim 1 wherein the gas added in step C contains oxygen, nitric oxide is produced, and the oxygen is allowed to oxidize the nitric oxide to nitrogen dioxide in-situ.

3. The process as set forth in claim 1 wherein nitric oxide is produced during the oxidization and said process comprising the further steps of:
   E. collecting nitric oxide as an off-gas;
   F. oxidizing the nitric oxide to nitrogen dioxide; and
   G. adding the nitrogen dioxide produced in step F to the slurry of step B.

4. The process as set forth in claim 1 wherein said sulfidic copper mineral is selected from the group consisting of chalcopyrite, chalcocite, digenite, covellite, bornite, mixtures thereof, and concentrates thereof.

5. The process as set forth in claim 1 wherein, in step C a nitrogen dioxide containing gas is sparged through the leach liquor.

6. The process as set forth in claim 1 wherein the leach liquor provided in step A contains $H_2SO_4$.

7. A process for leaching metal values selected from the group consisting of copper, silver, nickel, cobalt, molybdenum, zinc, iron and mixtures thereof from a sulfidic mineral containing said values, said process comprising the steps of:
   A. providing an aqueous leach liquor comprising sulfuric acid;
   B. mixing a particulate, sulfidic mineral containing at least one of said metal values with the leach liquor to form a slurry;
   C. containing said sulfidic mineral with a gas comprising nitrogen dioxide and oxygen in sufficient quantities to provide enough nitrogen dioxide to enable the nitrogen dioxide to be the principal oxidizing agent;
   D. agitating the slurry to contact nitrogen dioxide with mineral particles to produce metal values selected from the group consisting of $Cu^{++}$, $Ag^{++}$, $Fe^{++}$, $Fe^{+++}$, $Ni^{++}$, $Co^{++}$, $Mo^{++}$, $Zn^{++}$ and mixtures thereof and nitric oxide, said contacting of the mineral particles with nitrogen dioxide, oxidizing the mineral particles and being performed at a temperature below 115° C. and at a pressure between the range of atmospheric pressure and 35 psi; and,
   E. allowing the oxygen in said gas to regenerate nitrogen dioxide by oxidizing the nitric oxide produced in step D.

* * * * *